United States Patent [19]
Tamura

[11] Patent Number: 5,381,549
[45] Date of Patent: Jan. 10, 1995

[54] INFORMATION PROCESSING APPARATUS

[75] Inventor: Noboru Tamura, Tokyo, Japan

[73] Assignee: Canon Kabushiki Kaisha, Tokyo, Japan

[21] Appl. No.: 162,797

[22] Filed: Dec. 7, 1993

Related U.S. Application Data

[63] Continuation of Ser. No. 618,689, Nov. 27, 1990, abandoned.

[30] Foreign Application Priority Data

Nov. 29, 1989 [JP] Japan .................. 1-307586

[51] Int. Cl.⁶ .................. G06F 9/44; G06F 13/00
[52] U.S. Cl. .................. 395/700; 395/400; 364/255.1; 364/280; 364/280.2; 364/DIG. 1
[58] Field of Search ............... 395/400, 425, 650, 700; 364/255.1, 280, 280.2, 280.9, 281.3

[56] References Cited

U.S. PATENT DOCUMENTS

| | | | |
|---|---|---|---|
| 4,590,556 | 5/1986 | Berger et al. | 364/200 |
| 4,590,557 | 5/1986 | Lillie | 364/200 |
| 4,607,332 | 8/1986 | Goldberg | 364/900 |
| 4,626,986 | 12/1986 | Mori | 364/200 |
| 4,747,040 | 5/1988 | Blanset et al. | 395/650 |
| 5,202,994 | 4/1993 | Begur et al. | 395/700 |

Primary Examiner—Gareth D. Shaw
Assistant Examiner—Dennis M. Butler
Attorney, Agent, or Firm—Fitzpatrick, Cella, Harper & Scinto

[57] ABSTRACT

In an information processing apparatus which operates according to an OS (operating system) stored in a ROM or an OS read from the outside, when using the OS read from the outside, an area of an address space occupied by the OS in the ROM is released so that the released area is utilized by another memory.

5 Claims, 3 Drawing Sheets

INFORMATION PROCESSING APPARATUS

This application is a continuation of application Ser. No. 07/618,689 filed Nov. 27, 1990, which is now abandoned.

BACKGROUND OF THE INVENTION

1. Field of the Invention

This invention relates to an information processing apparatus for performing data processing by starting an operating system (OS) stored in a read-only memory (ROM) or an OS read from a secondary storage unit.

2. Description of the Related Art

Heretofore, in this kind of information processing apparatus, when using an OS stored in a ROM, a memory map for a ROM, a RAM (random access memory) and the like has been mostly configured as shown in FIG. 4.

On the other hand, when using an OS loaded from a secondary storage unit, such as a floppy disk or the like, without using an OS stored in the ROM, a memory map has been configured as shown in FIG. 5.

In FIGS. 4 and 5, there are shown a space 51 which can be utilized by the user, an OS area 52 within the ROM, and an area 53 for BOOT processing within the ROM, such as a BOOT program and the like. A loaded OS area 54 is an area occupied by an OS loaded from the secondary storage unit using the BOOT program.

In the state shown in FIG. 5, although the OSs are present in both the OSROM 52 and the loaded OS 54, what is actually used is the loaded OS. The OSROM 52 uselessly occupies the address space, and hence memory resources have not been effectively utilized.

In this kind of information processing apparatus, a method has been proposed which selects whether a BIOS (basic input/output system) is to be allocated to a ROM or to a RAM. In this case, however, in order to indicate the selection of the ROM or the RAM, hardware, such as a DIP switch and the like, and dedicated software for processing the hardware have been necessary.

SUMMARY OF THE INVENTION

It is an object of the present invention to provide an information processing apparatus which performs efficient allocation of address space in accordance with the use of an OS stored in a ROM or the loading of an OS from a secondary storage unit.

It is another object of the present invention to provide an information processing apparatus capable of utilizing an area allocated to an OS in a ROM within an address space for other uses when an OS has been loaded from a secondary storage unit.

According to one aspect, the present invention which achieves these objectives relates to an information processing apparatus comprising display means capable of simultaneously displaying a plurality of color images, display control means for controlling the display of each of the plurality of color images, color information storage means for storing color information usable for displaying the color images on the display means in a plurality of storage areas set in units of an image, and administration means for allocating each storage area of the color information storage means to each of the display control means so that a plurality of display control means can share an identical storage area among the storage areas.

According to another aspect, the present invention which achieves these objectives relates to an image processing apparatus capable of displaying color images, comprising display means capable of simultaneously displaying a plurality of color images, display control means for controlling the display of each of the plurality of color images, color information storage means for storing color information usable for displaying the color images on the display means in a plurality of storage areas set in units of an image, setting means for storing a plurality of setting information for the color information storage means, selection means for selecting a setting to be utilized from the plurality of setting information, and administration means for allocating each storage area of the color information storage means to each of the display control means so that a plurality of display control means can share an identical storage area among the storage areas.

Other objectives, features and advantages, besides those discussed above, will be apparent to those skilled in the art from the description of the preferred embodiment of the invention which follows. In the description, reference is made to the accompanying drawings, which form a part hereof, and which illustrate an example of the invention. Such example, however, is not exhaustive of the various embodiments of the invention, and therefore reference is made to the claims which follow the description for determining the scope of the invention.

DESCRIPTION OF THE PREFERRED EMBODIMENT

Figure 1:
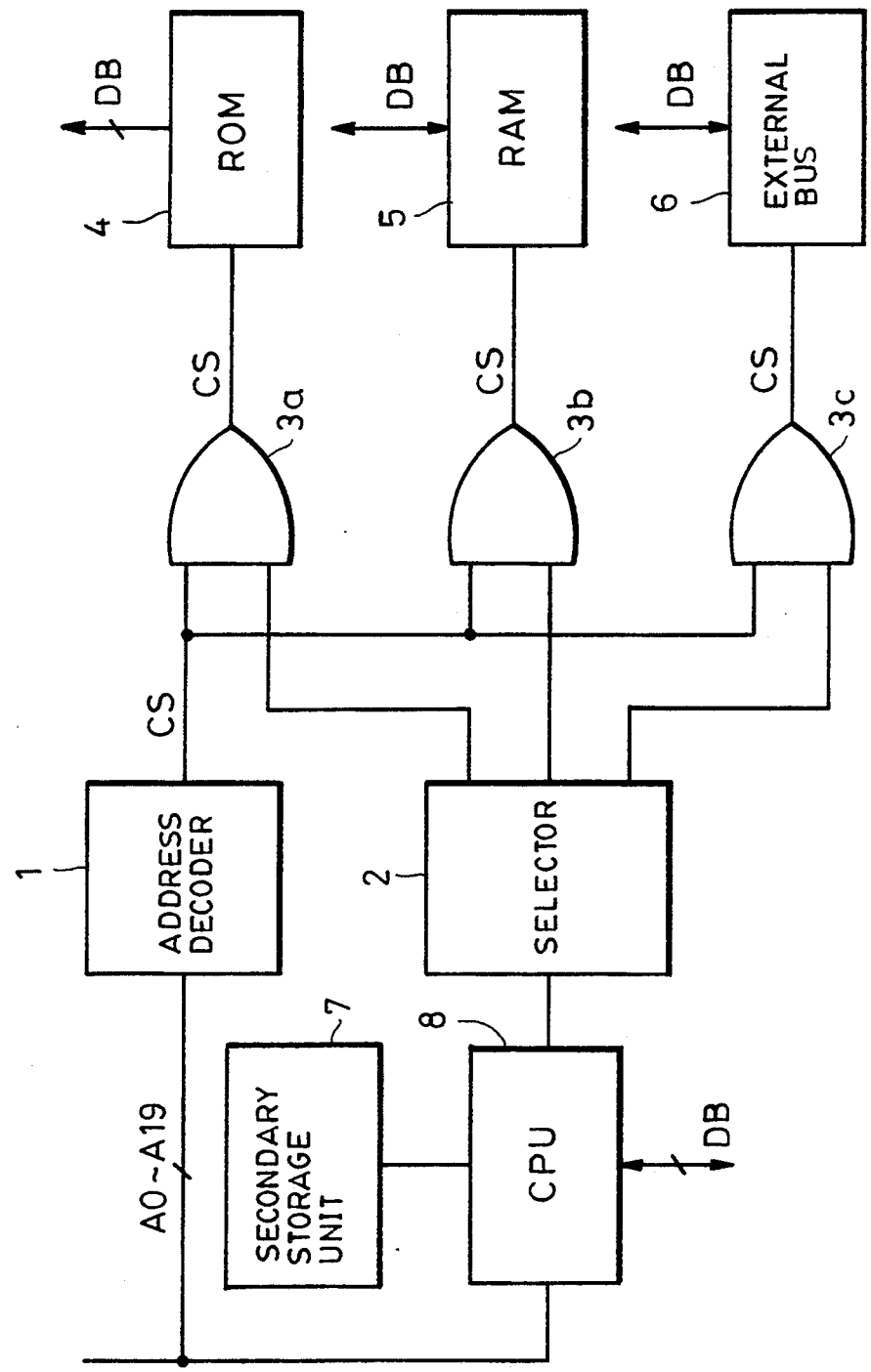
FIG. 1 is a block diagram showing the configuration of an information processing apparatus according to an embodiment of the present invention.

FIG. 1 is a block diagram showing the configuration of an information processing apparatus according to an embodiment of the present invention.

In FIG. 1, an address decoder 1 outputs a chip select signal CS to each of AND gates 3a–3c in accordance with an address signal from address bus (A0–A19). A selector 2 selects one of a ROM 4, a RAM 5 and external bus 6 by outputting a signal for selecting one of the AND gates 3a–3c.

The ROM 4 includes an OSROM 52 storing an operating system.

The RAM 5 temporarily stores various kinds of information.

A secondary storage unit 7, such as a floppy disk drive unit or the like, can load an OS separately from the OSROM 52.

A CPU 8 controls the respective components.

Figure 2:
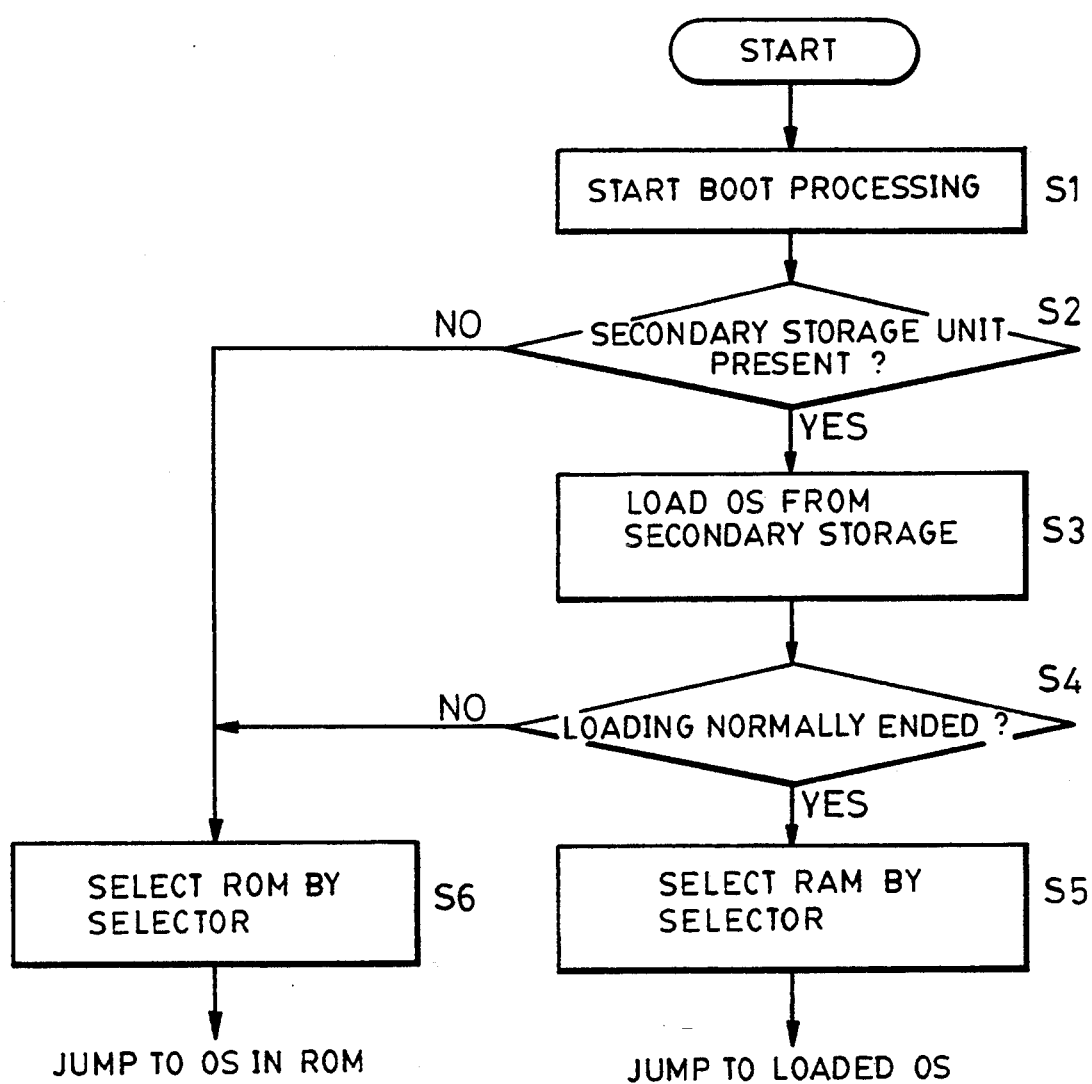
FIG. 2 is a flowchart of processing when starting the inventive apparatus.

FIG. 2 is a flowchart of processing when initiating the apparatus in the case of performing the processing using an external OS. The operation of the present invention will now be explained with reference to FIG. 2.

Figure 4:
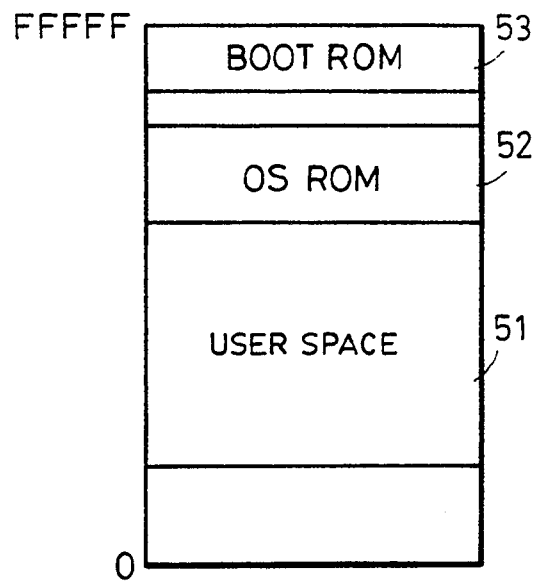
FIG. 4 is a diagram showing a memory map for the inventive apparatus before BOOT processing.

After BOOT processing has been started by a BOOT program at step S1, the apparatus determines whether or not a secondary storage unit is present at step S2. If a secondary storage unit is not present, the process proceeds to step 56, where the apparatus commands the selector 2 to select the ROM 4. The address map thereby remains in the state shown in FIG. 4, and the apparatus performs processing according to the OS stored in the OSROM 52.

If the secondary storage unit 7 is present, an OS is loaded from the secondary storage unit 7 at step S3 during initialization, and after initialization the apparatus determines whether or not the loading has been normally ended at step S4. If the loading has not been normally ended, the process proceeds to step S6. If the loading has been normally ended, the apparatus commands the selector 2 to select the RAM 5 at step S5, and transfers processing to the loaded OS. Subsequently, the apparatus performs processing according the read OS.

Figure 3:
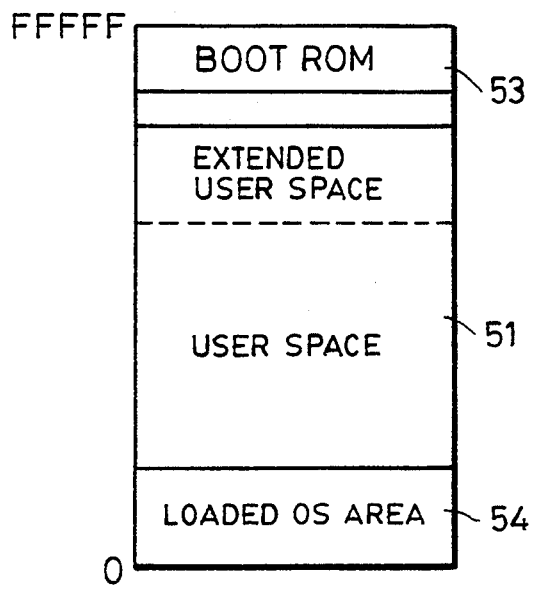
FIG. 3 is a diagram showing a memory map for the inventive apparatus after BOOT processing.
Figure 5:
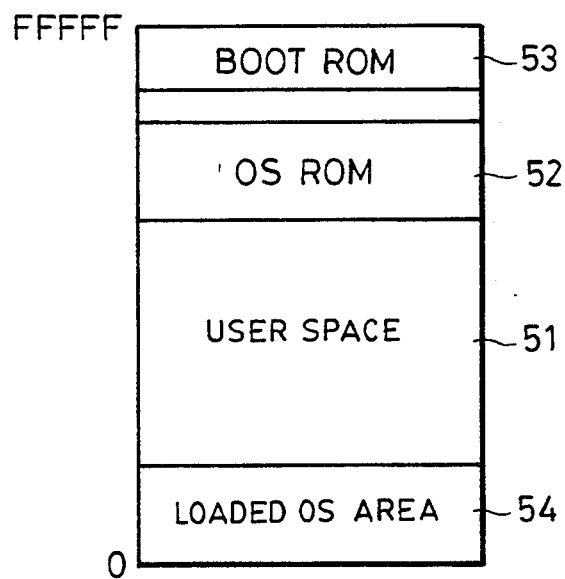
FIG. 5 is a diagram showing a memory map for a conventional apparatus after BOOT processing.

As described above, when processing is performed according to the loaded OS, access to an address allocated to by the OS within the ROM 4 is performed relative to the RAM 5 by the selector 2, and the memory map becomes as shown in FIG. 3. That is, the area allocated to the OSROM 52 in FIG. 5 is released as a user space. As a result, the user space is extended.

Although, in the above-described embodiment, an explanation has been provided of a case in which the area for the OSROM 52 is released as a user space for the RAM 5, the selector 2 may not select the RAM 5, but select external bus 6, and may access a memory medium connected to external bus 6.

As explained above, the present invention has the effect that, when using an OS read from the outside, an address space occupied by an OS in a ROM is released so that another memory can utilize the released space.

What is claimed is:

1. A programmed computer apparatus for processing information comprising:
   first internal storage means for storing a first operating system in advance;
   external storage means external to said apparatus, capable of storing a second operating system;
   second internal storage means for storing the second operating system;
   processing means, connected to said first and second internal storage means, for performing processing using the first or second operating system;
   loading means, connected to said external and second internal storage means, for loading the second operating system from said external storage means to said second internal storage means during initialization according to an instruction from said processing means;
   determination means, connected to said loading means, for determining whether or not the loading of the second operating system by said loading means has succeeded after the initialization; and
   mapping means, connected to said determination means and said first and second internal storage means, for mapping an address space according to the result of determination by said determination means, wherein said mapping means allocates an address area in the address space corresponding to the first operating system a first storage area in the first internal storage means storing the first operating system if the loading of the second operating system has not succeeded and allocates the address area corresponding to the first operating system to a second storage area in a different storage means other than the first internal storage means if the loading of the second operating system has succeeded.

2. A programmed computer apparatus for processing information according to claim 1, wherein said mapping means comprises selection means for selecting either said first internal storage means or said different storage means having the second storage area.

3. A programmed computer apparatus for processing information according to claim 1, wherein said different storage means is the second internal storage means.

4. A programmed computer apparatus for processing information according to claim 1, wherein said different storage means is a second external storage means external to the processor.

5. A method of computer implemented process for mapping an address space in an information processing apparatus having a first internal memory storing a first operating system and a second internal memory, the apparatus being detachably connected to an external memory storing a second operating system and performing processing using the first or second operating system, said method comprising the steps of:
   loading the second operating system from the external memory to the second internal memory if the second operating system is able to be loaded during initialization;
   determining whether or not the loading of the second operating system has succeeded after the initialization;
   mapping an address space according to the result of the determination;
   allocating an address area in the address space corresponding to the first operating system to a first storage area in the first internal memory storing the first operating system if the loading of the second operating system has not succeeded; and
   allocating the address area corresponding to the first operating system to a second storage area in a different memory other than the first internal memory if the loading of the second operating system has succeeded.

* * * * *

UNITED STATES PATENT AND TRADEMARK OFFICE
CERTIFICATE OF CORRECTION

PATENT NO. : 5,381,549
DATED : January 10, 1995
INVENTOR(S) : NOBORU TAMURA

It is certified that error appears in the above-identified patent and that said Letters Patent is hereby corrected as shown below:

COLUMN 3

Line 18, "according" should read --according to--.

COLUMN 4

Line 9, "system" should read --system to--.
   Line 30, "process" should read --processing--.

Signed and Sealed this

Sixteenth Day of May, 1995

Attest:

BRUCE LEHMAN

*Attesting Officer*     *Commissioner of Patents and Trademarks*